No. 753,796. PATENTED MAR. 1, 1904.
H. JARVIS & M. H. BLAKESLEE.
TYPE WRITING AND TABULATING MACHINE.
APPLICATION FILED JAN. 4, 1904.
NO MODEL. 4 SHEETS—SHEET 1.
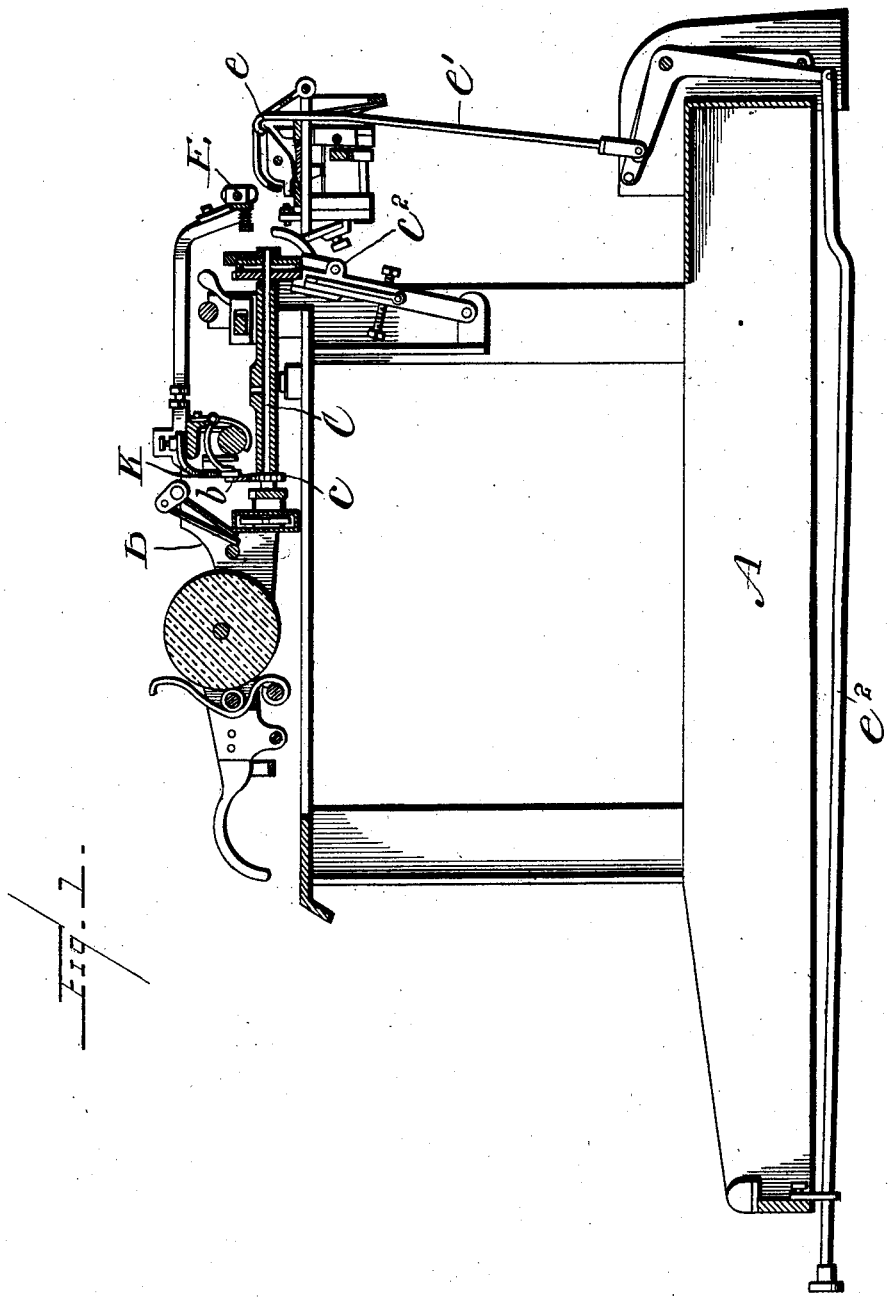

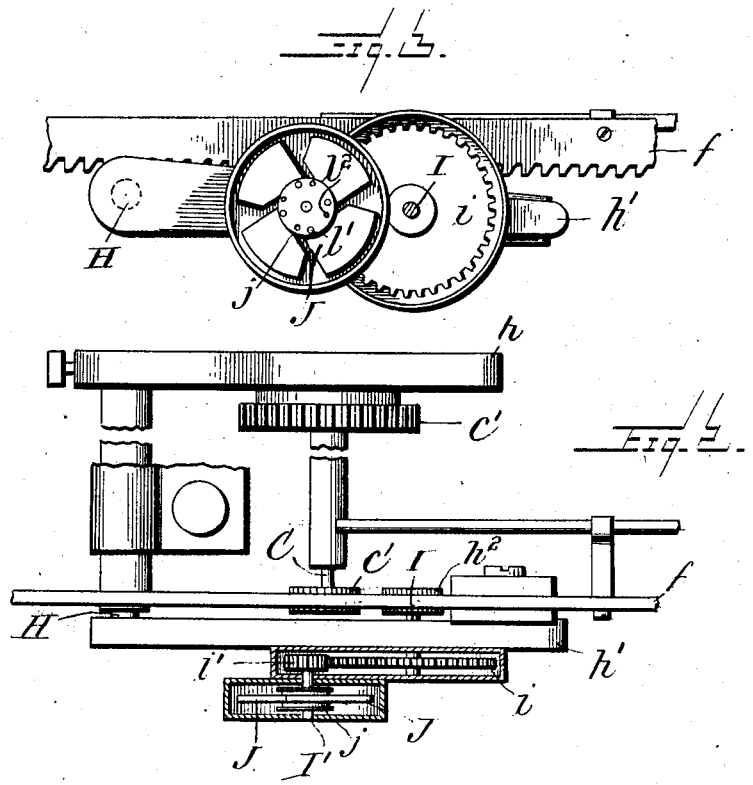
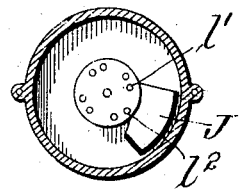
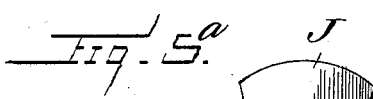

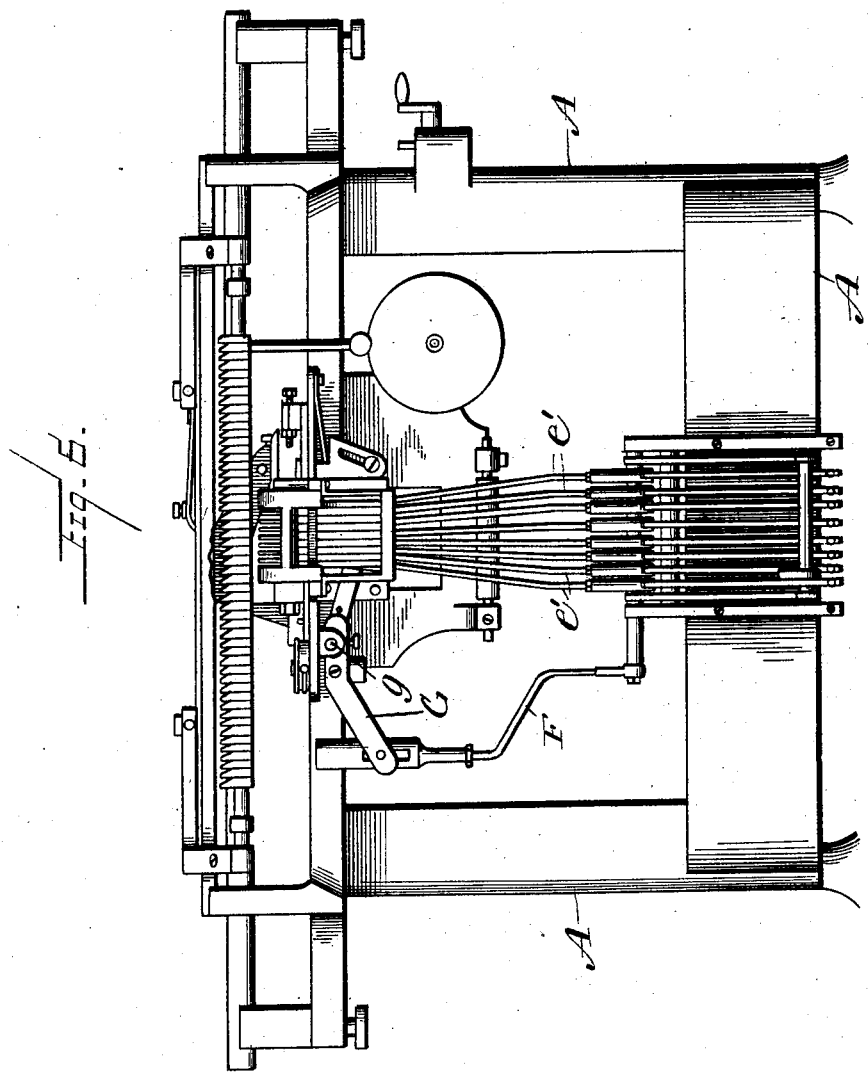

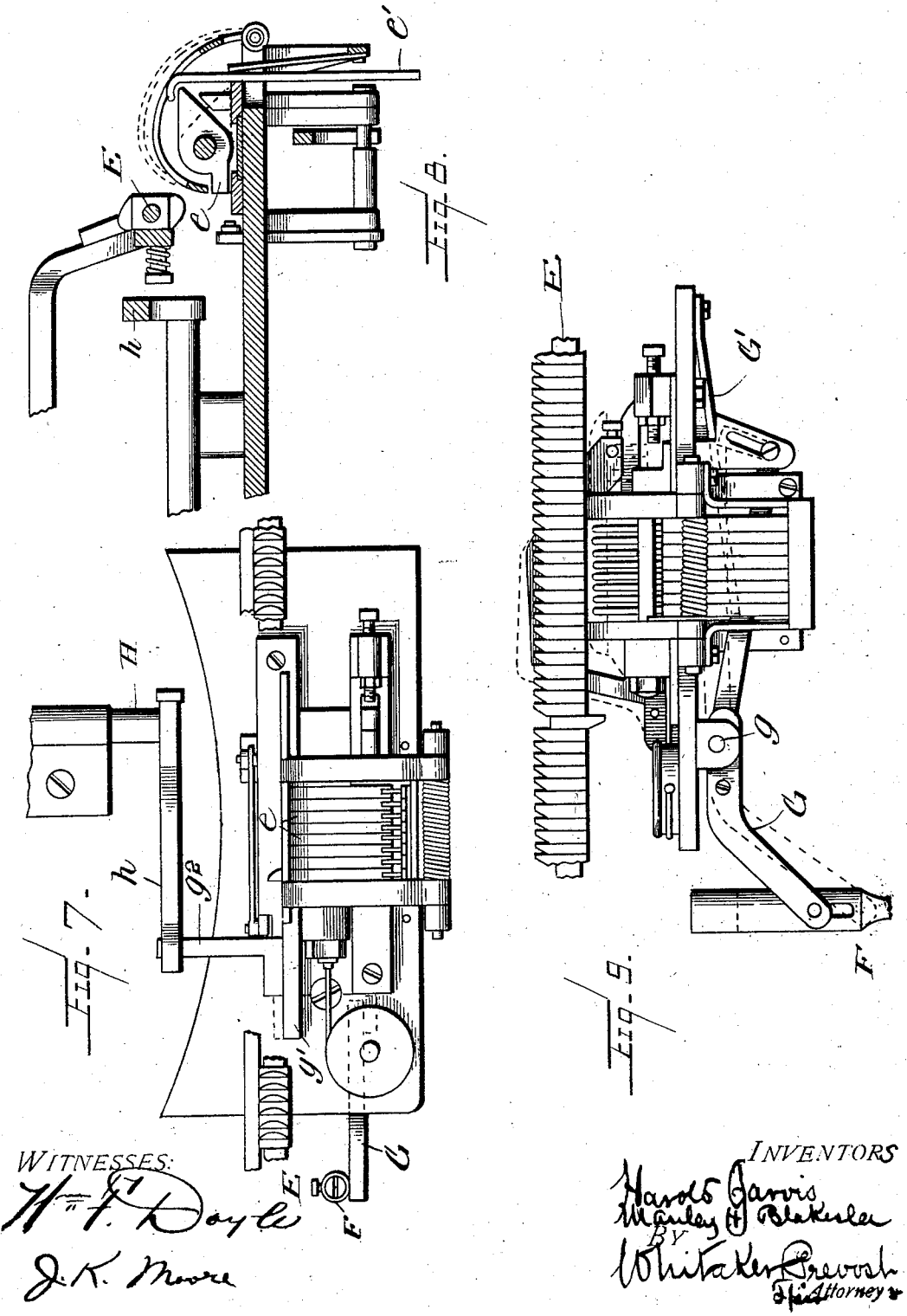

No. 753,796. Patented March 1, 1904.

UNITED STATES PATENT OFFICE.

HAROLD JARVIS AND MANLEY H. BLAKESLEE, OF BUFFALO, NEW YORK; SAID BLAKESLEE ASSIGNOR TO SAID JARVIS.

TYPE-WRITING AND TABULATING MACHINE.

SPECIFICATION forming part of Letters Patent No. 753,796, dated March 1, 1904.

Original application filed February 1, 1901, Serial No. 45,625. Divided and this application filed January 4, 1904. Serial No. 187,722.

(No model.)

*To all whom it may concern:*

Be it known that we, HAROLD JARVIS and MANLEY H. BLAKESLEE, citizens of the United States, residing at Buffalo, in the county of Erie and State of New York, have invented certain new and useful Improvements in Type-Writing and Tabulating Machines; and we do hereby declare the following to be a full, clear, and exact description of the invention, such as will enable others skilled in the art to which it appertains to make and use the same.

Our present invention relates to type-writing and tabulating machines, and is a part of the subject-matter of our former application, Serial No. 45,625, filed February 1, 1901, of which the present is a divisional application.

Our said invention has for its object the prevention of injurious shocks and jar on the sudden arresting of the motion of the paper-carriage; and it consists in the combination, with the paper-carriage of a type-writer having a feeding mechanism which suddenly arrests the motion of the carriage, of a governor for controlling the speed of the carriage.

In the drawings we have illustrated the best form in which we have contemplated embodying our said invention, and the same is disclosed in the following description and claims.

In the said drawings, Figure 1 is a longitudinal vertical section of a tabulating type-writer embodying our invention. Fig. 2 is a partial top plan view with parts in section. Fig. 3 is a front elevation of the governor and some connected parts. Fig. 4 shows a modified construction, and Fig. 5 is a sectional view of the friction-governor. Fig. 5$^a$ is a view of one of the friction-arms of the governor. Fig. 6 is a rear elevation of a type-writer embodying our invention. Figs. 7 and 8 are views showing more clearly the means for throwing the governor into and out of operation. Fig. 9 is a view illustrating the relation of the column stop-bar and the dogs for engaging with the same and the rods for operating them.

In the said drawings, A is the frame of the machine, having the usual type-keys, type-levers, spacing-bar, and feeding mechanism, all of which devices may be of ordinary construction and most of which are omitted from the drawings in order that the new parts composing our present improvement and the devices with which they more immediately coact may be most clearly shown.

B is the paper-carriage, mounted to slide transversely of the machine under the force of a spring in the usual manner, the spring not being shown.

$b$ is a rack-bar connected with the carriage and moving with it. This rack-bar is normally in the position shown in Fig. 1 and in that position engages with a pinion $c$ on the forward end of a shaft C, extending longitudinally of the machine. The rear end of the shaft C is provided with a ratchet escapement-wheel $c'$ of a well-known type, and $c^2$ represents the escapement-pawls for engaging the ratchet-wheel $c'$ in a well-known manner, and said pawls are connected with the type-keys and spacing-key also in the usual manner in order that they may be operated to effect the proper movements of the carriage in ordinary type-writing.

E is the column stop-bar of the tabulating mechanism, which said bar carries stops which may be moved into and out of operative position to produce one or more stoppings of the carriage at desired points in its movements across the machine.

$e\ e$ are a series of dogs for engaging the stops on the column stop-bar when such stops are properly arranged to accomplish the stopping of the carriage. $e'\ e'$ are rods controlling said dogs, and $e^2$ represents the push-keys moving the rods $e'$.

F is a rod connected so as to be moved downward every time a push-key is operated.

G is an arm or lever secured to a rock-shaft $g$, which forms the pivot for said arm or lever. One end of this arm or lever is pivoted to the rod F. To the other or forward end of the rock-shaft $g$ is secured an arm $g'$, and to this arm is secured the lug or projection $g^2$. The lug or projection $g^2$ is on the opposite side of the rock-shaft $g$ from the arm or lever G, so that when the latter is moved downward the lug $g^2$ will be given an upward movement.

G' is a spring tending to move the rock-shaft $g$ and lever G in the opposite direction to that in which it is moved by the rod F and serves to return the said lever and rod to their original positions after having been once moved by the push-bars.

The lug or projection $g^2$ extends under the free end of an arm $h$, rigidly connected with the rock-shaft H, mounted on the frame of the machine parallel with the shaft C. To the opposite and forward end of the shaft H is secured the arm $h'$, near the free end of which is mounted the governor for the carriage, which we will now proceed to describe. A shaft I is journaled in the arm $h'$. The rearward end of this shaft is provided with a pinion $h^2$ in the same vertical plane as the pinion $c$ on shaft C. The forward end of the shaft I is provided with a spur-gear $i$, which meshes with a pinion $i'$ on a shaft I'. The opposite end of the shaft I' is provided with two disks $j\ j$, between which are pivoted friction levers or arms J. These arms we have made of the shape shown in Fig. $5^a$ and are pivoted to the disks $j\ j$, so that as the shaft I' is revolved the free ends of the same are thrown outward against the casing, in which they are housed, and their movement is by such frictional contact retarded.

While the pinion $h^2$ is in the same vertical plane as the pinion $c$ on the shaft C, it normally lies in a lower horizontal plane and out of contact with the rack $b$. When, however, one of the push-rods is operated, its connecting mechanism raises the free end of the arm $h$, the rock-shaft H is rocked, and the free end of the arm $h'$, with the pinion $h^2$, is raised, bringing the pinion $h^2$ in mesh with the rack-bar and lifting the latter out of contact with the pinion $c$. This releases the carriage from the control of the escapement devices, and it is free to move under the force of its actuating-spring until arrested by other means. While it is thus moving the pinion $h^2$ is rotated by the rack. This causes a much more rapid movement of the friction-arms J, which motion tends to throw the arms outward with a force proportioned to their rapidity of movement. The greater the movement of the carriage the greater the pressure of the arms J against the casing.

The rack $b$ is not rigidly secured to the paper-carriage, but is mounted to have a slight vertical movement upward when engaged by the pinion $h^2$. It is normally kept in its depressed position by a spring $k$. (See Fig. 1.)

The arms J may be made of different form should this be found desirable or believed to be advantageous. The arms J are ordinarily of such proportions as to effect the purpose desired; but if a greater degree of retardation is required the position of the arms may be reversed, so that their engagment with the casing may tend to turn them farther outward, producing much greater friction and a correspondingly greater retarding action. The casing is a desirable form of construction; but any construction which will supply an exterior friction-surface may be substituted.

In Fig. 4 we have shown a construction by which one or more of the arms J may be placed in a reverse position, so that the friction of the arm or arms so reversed will tend to increase the resistance of the governor to the forward movement of the carriage.

It will be seen that the arms J of the governor are pivoted upon screws $l$. Fig. 4 shows the disks provided with two holes $l'\ l^2$ for each arm. When all of the arms are in the position shown in Fig. 3, one or more of them can be reversed by withdrawing the screw or screws $l$, then reversing the arm or arms, and pivoting the same on the screw inserted, passing the same through the hole $l^2$ in the disk. When a closed casing is employed, to facilitate this operation the front of the casing should be removably secured by screws $k^2$, as shown in Fig. 5, or by other preferred means.

What we claim, and desire to secure by Letters Patent, is—

1. In a type-writing machine, the combination with the paper-carriage, of an escapement feeding mechanism suddenly arresting the forward movement of said carriage and a governor for regulating the speed of the carriage, substantially as described.

2. A spacing attachment for type-writers comprising a series of keys, each key arranged to disengage the carriage from its feeding mechanism and to arrest the same at a different point, and a governor for regulating the speed of said carriage, substantially as described.

3. A type-writer having provision for feeding the paper-carriage predetermined spaces of varying distances and a governor for regulating the speed of said carriage, substantially as described.

4. A type-writer having provision for taking the paper-carriage from the control of its step-by-step feeding devices, and putting it in control of a variable spacing mechanism, and a governor for the paper-carriage when controlled by the varying spacing mechanism, substantially as described.

5. A type-writer having feeding devices for feeding the paper-carriage a number of letter-spaces at a time and a governor for regulating the speed of the carriage, substantially as described.

6. A governor for type-writer carriages comprising among its members a revolving shaft, a series of centrifugally-movable friction-arms, an exterior friction-surface, and connections with said carriage to rotate said shaft, the said friction-arms being reversible to change the amount of friction, substantially as described.

7. The combination with the carriage having a feed-rack, of a movably-mounted shaft having a pinion in the vertical plane of the rack but normally out of contact with it, a governor connected with said shaft and means for moving one of said parts to bring the pinion and rack into engagement, substantially as described.

8. In a type-writer, a paper-carriage having a movable feed-rack, a step-by-step escapement mechanism controlling said carriage through a pinion engaging said rack, a movably-mounted shaft having a connected governor and a pinion, and means for bringing the pinion of said movable shaft and said rack into engagement and for throwing said rack and pinion out of engagement, substantially as described.

In testimony whereof we affix our signatures in the presence of two witnesses.

HAROLD JARVIS.
MANLEY H. BLAKESLEE.

Witnesses:
　THEO. L. POPP,
　EMMA M. GRAHAM.